(12) United States Patent
Uchiyama

(10) Patent No.: US 9,770,692 B2
(45) Date of Patent: Sep. 26, 2017

(54) MOISTURE PERMEABLE FILTER MEDIUM

(71) Applicant: NITTO DENKO CORPORATION, Ibaraki-shi, Osaka (JP)

(72) Inventor: Shiho Uchiyama, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/107,821

(22) PCT Filed: Nov. 26, 2014

(86) PCT No.: PCT/JP2014/081224
§ 371 (c)(1),
(2) Date: Jun. 23, 2016

(87) PCT Pub. No.: WO2015/098404
PCT Pub. Date: Jul. 2, 2015

(65) Prior Publication Data
US 2016/0325238 A1  Nov. 10, 2016

(30) Foreign Application Priority Data
Dec. 27, 2013 (JP) ................................. 2013-272760

(51) Int. Cl.
*B01D 53/22* (2006.01)
*B01D 71/36* (2006.01)
(Continued)

(52) U.S. Cl.
CPC ............ *B01D 71/36* (2013.01); *B01D 53/22* (2013.01); *B01D 53/26* (2013.01); *B01D 53/266* (2013.01);
(Continued)

(58) Field of Classification Search
CPC ........ B01D 69/12; B01D 69/02; B01D 71/36; B01D 2325/04; B01D 53/266;
(Continued)

(56) References Cited

U.S. PATENT DOCUMENTS 6,261,979 B1    7/2001  Tanaka et al.
9,358,507 B2 *  6/2016  Hirai ................... B01D 63/082
(Continued)

FOREIGN PATENT DOCUMENTS

JP      11-57377 A       3/1999
JP   2000-350918 A      12/2000
(Continued)

OTHER PUBLICATIONS

International Search Report dated Mar. 3, 2015, issued in counterpart International Application No. PCT/JP2014/081224 (2 pages).
(Continued)

*Primary Examiner* — Anthony Shumate
(74) *Attorney, Agent, or Firm* — Westerman, Hattori, Daniels & Adrian, LLP

(57) ABSTRACT

Provided is a moisture permeable filter medium formed by laminating a hydrophobic layer having hydrophobicity and a hydrophilic layer having hydrophilicity together, in which one of the hydrophobic layer and the hydrophilic layer is composed of a PTFE porous film formed using PTFE, and the other of the hydrophobic layer and the hydrophilic layer is composed of an air permeable sheet to which air is permeable.

4 Claims, 1 Drawing Sheet

(51) Int. Cl.
  *B01D 53/26* (2006.01)
  *B01D 67/00* (2006.01)
  *B01D 69/02* (2006.01)
  *B01D 69/12* (2006.01)
  *B01D 61/36* (2006.01)
  *B01D 71/38* (2006.01)

(52) U.S. Cl.
  CPC ......... *B01D 67/0093* (2013.01); *B01D 69/02* (2013.01); *B01D 69/12* (2013.01); *B01D 61/36* (2013.01); *B01D 71/38* (2013.01); *B01D 2323/02* (2013.01); *B01D 2323/30* (2013.01); *B01D 2325/04* (2013.01); *B01D 2325/36* (2013.01); *B01D 2325/38* (2013.01)

(58) Field of Classification Search
  CPC ............ B01D 2325/38; B01D 2325/36; B01D 2257/80; B01D 2258/0266; B01D 63/02; B01D 2053/224
  See application file for complete search history.

(56) References Cited

U.S. PATENT DOCUMENTS

| | | |
|---|---|---|
| 2003/0051451 A1 | 3/2003 | Kusunose et al. |
| 2009/0324929 A1 | 12/2009 | Yamakawa et al. |
| 2013/0199370 A1 | 8/2013 | Okada et al. |
| 2013/0287678 A1 | 10/2013 | Okada et al. |
| 2014/0290479 A1 | 10/2014 | Okada et al. |
| 2015/0311546 A1 | 10/2015 | Yamakawa et al. |
| 2015/0328591 A1* | 11/2015 | Morita .................. B01D 69/06 210/500.29 |

FOREIGN PATENT DOCUMENTS

| | | |
|---|---|---|
| JP | 2003-97831 A | 4/2003 |
| JP | 2010-5515 A | 1/2010 |
| WO | 2012/014900 A1 | 2/2012 |
| WO | 2012018089 A1 | 2/2012 |
| WO | 2012/086836 A1 | 6/2012 |

OTHER PUBLICATIONS

Notification of Transmittal of Translation of the International Preliminary Report on Patentability (Form PCT/IB/326) issued in counterpart International Application No. PCT/JP2014/081224 mailed Jul. 7, 2016 with Forms PCT/IB/373, PCT/IB/338 and PCT/ISA/237. (14 pages).

Extended European Search Report (including Supplementary European Search Report and Search Opinion) dated Jul. 26, 2017 in counterpart European Patent Application No. 14873489.0 (in English; 8 pages).

\* cited by examiner

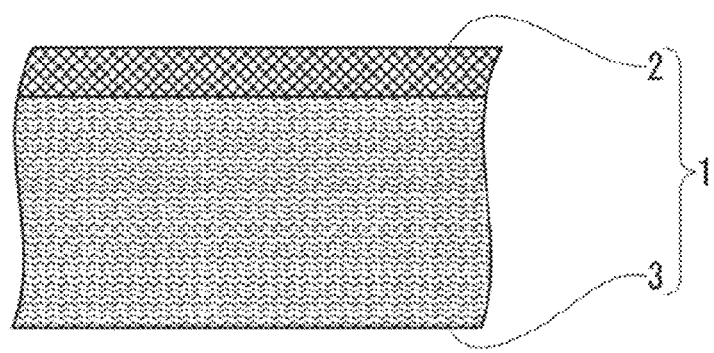

MOISTURE PERMEABLE FILTER MEDIUM

CROSS-REFERENCE TO RELATED APPLICATION

This application claims priority to Japanese Patent Application No. 2013-272760, the disclosure of which is incorporated herein by reference in its entirety.

FIELD

The present invention relates to a filter medium having moisture permeability, particularly to a filter medium formed using a PTFE porous film.

BACKGROUND

Conventionally, a method for adjusting the humidity of at least one of two gases having different humidity by disposing the two gases so as to be adjacent to each other via a filter medium to which moisture is permeable (moisture permeable filter medium), thereby moving the moisture (water vapor) from the gas having higher humidity to the gas having lower humidity via the moisture permeable filter medium has been known. For example, a method using a member constituted by housing an adsorbent in a bag that is formed using a moisture permeable filter medium is known (see Patent Literature 1).

The air inside the member has lower humidity than the air outside the bag because the adsorbent adsorbs water vapor. This allows the water vapor in the outside air to permeate through the moisture permeable filter medium so as to enter the bag, so that the water vapor is adsorbed by the adsorbent. That is, humidity adjustment (humidification) of the air (the air outside the bag) in a specific space is enabled by disposing such a member in the space.

The moisture permeable filter medium as described above needs to allow water vapor to permeate therethrough and to be capable of partitioning a space well into spaces that are adjacent to each other via the moisture permeable filter medium. As a material constituting such a moisture permeable filter medium, a polytetrafluoroethylene porous film (hereinafter, referred to also as a PTFE porous film) is used. Such a PTFE porous film is known to have good moisture permeability. Therefore, by disposing the two gases having different humidity so as to be adjacent to each other via the PTFE porous film, the movement of the water vapor (by permeating through the moisture permeable filter medium) from the gas having higher humidity to the gas having lower humidity is enabled, while the two gases are separated.

Meanwhile, the PTFE porous film as described above is comparatively thin and is not stiff. Therefore, sole use of the PTFE porous film as a moisture permeable filter medium results in poor handling. Therefore, a moisture permeable filter medium having good handleability (stiffness) is provided by laminating an air permeable sheet having a certain thickness to the PTFE porous film.

However, such a moisture permeable filter medium is thicker than the PTFE porous film alone, because the air permeable sheet is laminated to the PTFE porous film. Here, the moisture permeability to the moisture permeable filter medium (mobility of the water vapor from one surface side to the other surface side) is inversely proportional to the thickness of the filter medium. Therefore, the moisture permeability to the aforementioned moisture permeable filter medium is lower than that to the PTFE porous film alone.

Thus, the water vapor cannot effectively permeate through the moisture permeable filter medium from one surface side to the other surface side.

CITATION LIST

Patent Literature

Patent Literature 1: JP H 11-57377 A

SUMMARY

Technical Problem

It is therefore an object of the present invention to provide a moisture permeable filter medium formed by laminating an air permeable sheet to a PTFE porous film, in which a reduction in moisture permeability from the moisture permeability to the PTFE porous film itself is suppressed.

Solution to Problem

A moisture permeable filter medium according to the present invention is formed into a sheet so that water vapor is permeable from at least one surface side to the other surface side. The moisture permeable filter medium includes: a hydrophobic layer having hydrophobicity and a hydrophilic layer having hydrophilicity that are laminated together, wherein one of the hydrophobic layer and the hydrophilic layer is composed of a PTFE porous film using PTFE, and the other of the hydrophobic layer and the hydrophilic layer is composed of an air permeable sheet to which air is permeable.

It is preferable that the air permeable sheet be formed using non-woven fabrics, and the non-woven fabrics have a thickness of 20 μm or more and 1000 μm or less.

It is preferable that the hydrophobic layer and the hydrophilic layer be laminated to be in contact with each other.

BRIEF DESCRIPTION OF DRAWING

FIG. 1 is a sectional view of a moisture permeable filter medium according to an embodiment of the present invention.

DESCRIPTION OF EMBODIMENTS

Hereinafter, an embodiment of the present invention is described with reference to FIG. 1. In the following drawing, the same or corresponding portions are denoted by the same reference numerals, and the description thereof is not repeated.

As shown in FIG. 1, a moisture permeable filter medium 1 according to this embodiment has a sheet-like shape. Further, the moisture permeable filter medium 1 is configured so that water vapor is permeable from one surface side toward the other surface side. Specifically, the moisture permeable filter medium 1 is constituted by laminating a hydrophobic layer 2 having hydrophobicity and a hydrophilic layer 3 having hydrophilicity. Being hydrophilic means that the water absorption coefficient of the material constituting each layer (specifically, resin itself) is 0.01% or more, and being hydrophobic means that the water absorption coefficient of the material constituting each layer (specifically, resin itself) is less than 0.01%. The water absorption coefficient is measured according to ASTM standard D570 under the conditions of 23 degrees and 24 hours.

The moisture permeable filter medium 1 is composed of a PTFE porous film formed using PTFE and an air permeable sheet with air permeability. Specifically, one of the hydrophobic layer 2 and the hydrophilic layer 3 is composed of a PTFE porous film, and the other of the hydrophobic layer 2 and the hydrophilic layer 3 is composed of an air permeable sheet. That is, in the case where the hydrophobic layer 2 is composed of a PTFE porous film, the hydrophilic layer 3 is composed of an air permeable sheet, and in the case where the hydrophilic layer 3 is composed of a PTFE porous film, the hydrophobic layer 2 is composed of an air permeable sheet. Hereinafter, the case where the hydrophobic layer 2 is composed of a PTFE porous film, and the hydrophilic layer 3 is composed of an air permeable sheet will be described.

In the case where the hydrophobic layer 2 is composed of a PTFE porous film, a PTFE porous film having hydrophobicity is used. The water absorption coefficient of the PTFE porous film is not specifically limited, but is less than 0.01%, and is preferably 0%. Further, it is preferable that the PTFE porous film be porous and have a pressure loss of 80 mmH$_2$O or less at a permeation rate of 5.3 cm/sec. Further, in the conditions of a permeation rate of 5.3 cm/sec and a measured particle size of 0.1 μm or more and 0.2 μm or less, the PTFE porous film preferably has a capture efficiency of 60% or more, more preferably 70% or more, and preferably has a PF value of 22 or more. As a method for forming the PTFE porous film, the following method, for example, can be employed.

Specifically, a paste mixture is formed by adding a liquid lubricant to PTFE fine powder. The liquid lubricant is not specifically limited, as long as it can impart appropriate wettability to the surface of the mixture, and a liquid lubricant that can be removed by extraction or heat treatment is particularly preferable. For example, hydrocarbons such as fluidized paraffin, naphtha, and white oil are used as a liquid lubricant. The addition amount of the liquid lubricant is not specifically limited. For example, the addition amount is preferably 5 parts by mass or more and 50 parts by mass or less, with respect to 100 parts by mass of the PTFE fine powder.

Then, the mixture is preformed so as to form a preform. The preforming is preferably performed with a pressure such that the liquid lubricant does not separate from the mixture. Next, the obtained preform is formed by extrusion or rolling into a sheet. Thereafter, the obtained formed product is made porous by uniaxial or biaxial stretching, to form a PTFE porous film. The stretching conditions are not specifically limited. For example, the stretch ratio for each axis is preferably 1.5 times or more and 200 times or less under the temperature environment of 30° C. or more and 400° C. or less. Further, in the case where a sintering process is not performed in the stretching step, the PTFE porous film is preferably sintered at a temperature of the melting point or more after the stretching step.

In the case where the hydrophilic layer 3 is composed of an air permeable sheet, an air permeable sheet having hydrophilicity is used. The water absorption coefficient of the material constituting the air permeable sheet (specifically, resin itself) is not specifically limited, but is 0.01% or more, preferably 0.03% or more and 2% or less, more preferably 0.3% or more and 1.6% or less. The air permeable sheet is not specifically limited. For example, non-woven fabrics, woven fabrics, nets, or the like can be used therefor, but use of non-woven fabrics is particularly preferable.

Further, in the case where the PTFE porous film (the hydrophobic layer 2) and the air permeable sheet (the hydrophilic layer 3) are heat-welded (heat-laminated), use of non-woven fabrics made of a material having thermoplasticity as the air permeable sheet is preferable. For example, use of non-woven fabrics composed of synthetic fibers such as polyolefin (such as polyethylene and polypropylene), polyamide, polyester, aromatic polyamide, acrylic, and polyimide, or a composite material of these as the air permeable sheet is preferable.

Further, the non-woven fabrics are preferably composed of fibers containing two components having different melting points as raw materials. For example, non-woven fabrics formed by core-sheath fibers with the core part and the sheath part being composed of components having different melting points can be used. Examples of the non-woven fabrics (air permeable sheet) composed of core-sheath fibers include non-woven fabrics composed of core-sheath fibers with the core part made of polypropylene (PP) and the sheath part made of polyethylene (PE). Such non-woven fabrics are subjected to PMMA treatment, thereby allowing PE forming the sheath part to have hydrophilicity. Alternatively, non-woven fabrics composed of core-sheath fibers with the core part made of polypropylene terephthalate (PET) and the sheath part made of nylon 6 (PA6) can be mentioned. Further, the non-woven fabrics are configured to have hydrophilicity because PA6 forming the sheath part has hydrophilicity. That is, the hydrophilicity of the above-described non-woven fabrics (air permeable sheet) is derived from the configuration of the sheath part.

The fibers constituting the non-woven fabrics may be composed of one component, and may be composed of fibers of ethylene vinyl acetate (EVA), for example. Such non-woven fabrics have hydrophilicity because EVA is a material having hydrophilicity. Further, the air permeable sheet may be configured to have hydrophilicity by subjecting the materials constituting the air permeable sheet to plasma treatment.

In the case where the air permeable sheet is composed of non-woven fabrics, the thickness of the non-woven fabrics (that is, the thickness of the hydrophilic layer 3) is not specifically limited, and is preferably 20 μm or more and 1000 μm or less, more preferably 50 μm or more and 500 μm or less, for example. Further, the mass per unit area of the non-woven fabrics is preferably 2 g/m$^2$ or more and 200 g/m$^2$ or less, more preferably 10 g/m$^2$ or more and 100 g/m$^2$ or less.

The method for forming the moisture permeable filter medium 1 by laminating the hydrophobic layer 2 and the hydrophilic layer 3 is not specifically limited. For example, a method of laminating the hydrophobic layer 2 and the hydrophilic layer 3 by pressure bonding of an air permeable sheet (preferably, non-woven fabrics) that has been softened by heating to a PTFE porous film (that is, heat lamination) can be employed. Alternatively, a method of laminating the hydrophobic layer 2 and the hydrophilic layer 3 by pressure bonding of the PTFE porous film and the air permeable sheet with a hot melting or pressure sensitive adhesive agent disposed between the PTFE porous film and the air permeable sheet can be employed. That is, in the moisture permeable filter medium 1 of the present embodiment, the hydrophobic layer 2 and the hydrophilic layer 3 are laminated together to be in contact with each other.

The method for pressure bonding the PTFE porous film and the air permeable sheet is not specifically limited. For example, a method of continuously pressure bonding the PTFE porous film and the air permeable sheet by conveying the PTFE porous film and the air permeable sheet to a position between a pair of roller members (not shown) while laminating them can be employed. Alternatively, a method of intermittently pressure bonding each sheet while a sheet-shaped PTFE porous film and an air permeable sheet laminated together are disposed between a pair of plates (not shown) may be employed.

The thickness of the moisture permeable filter medium 1 formed as described above is not specifically limited. For example, the thickness is preferably 0.02 mm or more and 0.5 mm or less, more preferably 0.07 mm or more and 0.3 mm or less. Further, the moisture permeability to the moisture permeable filter medium 1 is not specifically limited. For example, the moisture permeability per hour is preferably 150 $g/m^2$ or more and 175 $g/m^2$ or less, more preferably 160 $g/m^2$ or more and 170 $g/m^2$ or less. The moisture permeability is measured by the method described in Examples below.

As described above, according to the moisture permeable filter medium of the present invention, even in the state where the air permeable sheet is laminated to the PTFE porous film, the reduction in moisture permeability from the moisture permeability to the PTFE porous film itself can be suppressed.

That is, water vapor permeates through the moisture permeable filter medium 1 from one surface side toward the other surface side when two gases having different humidity are arranged adjacent to each other via the moisture permeable filter medium 1. At this time, one of the hydrophobic layer 2 and the hydrophilic layer 3 is composed of the PTFE porous film, and the other of the hydrophobic layer 2 and the hydrophilic layer 3 is composed of the air permeable sheet, thereby causing a difference in amount of water vapor between the inside of the hydrophobic layer 2 and the inside of the hydrophilic layer 3. Then, the difference in amount of water vapor increases the permeation rate of water vapor from one surface side to the other surface side of the moisture permeable filter medium 1. This can suppress the reduction in moisture permeability (reduction from the moisture permeability to the PTFE porous film alone) caused by lamination of the air permeable sheet to the PTFE porous film, so that the moisture permeable filter medium 1 that allows good moisture permeability can be obtained.

Specifically, in the case where the moisture permeable filter medium 1 is formed by laminating an air permeable sheet (non-woven fabrics) with a configuration as described above to a PTFE porous film, the moisture permeability to the moisture permeable filter medium 1 is conventionally reduced significantly from the moisture permeability to the PTFE porous film alone. However, when one of the hydrophilic layer 3 and the hydrophobic layer 2 is composed of a PTFE porous film formed using PTFE, and the above-described non-woven fabrics are used as the air permeable sheet constituting the other of the hydrophilic layer 3 and the hydrophobic layer 2, as in this embodiment, the reduction in moisture permeability caused due to the lamination of the air permeable sheet to the PTFE porous film can be suppressed, and the moisture permeable filter medium 1 that allows good moisture permeability can be obtained. In particular, the reduction in moisture permeability from the hydrophilic layer 3 side toward the hydrophobic layer 2 side (in other words, from the side with a large amount of water vapor to the side with a small amount of water vapor within the layers) can be suitably suppressed.

Further, since the hydrophobic layer 2 and the hydrophilic layer 3 are in contact with each other, the distance between the hydrophilic layer 3 and the hydrophobic layer 2 is reduced, as compared to the case where another layer is interposed between the hydrophilic layer 3 and the hydrophobic layer 2. Therefore, the difference in concentration of water vapor between the hydrophilic layer 3 and the hydrophobic layer 2 allows water vapor to move faster. Therefore, the reduction in moisture permeability caused by the lamination of the air permeable sheet to the PTFE porous film can be more suppressed, and the moisture permeable filter medium 1 that allows good moisture permeability can be obtained.

In the case where two gases having different humidity are arranged adjacent to each other via the moisture permeable filter medium 1, it is preferable that the gas having higher humidity be arranged on the hydrophilic layer side, and the gas having lower humidity be arranged on the hydrophobic layer side, but they may be reversed.

The moisture permeable filter medium according to the present invention is not limited to the above-described embodiments, and various modifications can be made without departing from the gist of the present invention. Further, the above-described configurations, methods, or the like, of the plurality of embodiments may be optionally employed and combined (a configuration, method, or the like, according to one embodiment may be applied to a configuration, method, or the like, according to another embodiment), and it is a matter of course that configurations, methods, or the like according to various modifications described below may be optionally selected to be employed for the configurations, methods, or the like, according to the above-described embodiments.

For example, in the above-described embodiments, the hydrophobic layer 2 is formed from the PTFE porous film, and the hydrophilic layer 3 is formed from the air permeable sheet, but there is no limitation to this. For example, the hydrophilic layer 3 may be formed using a hydrophilized PTFE porous film, and the hydrophobic layer 2 may be formed using an air permeable sheet having hydrophobicity. As the hydrophilized PTFE porous film, a PTFE porous film (having a core-sheath structure of PVA and PTFE) hydrophilized by polyvinyl alcohol (PVA), for example, can be used. On the other hand, as the air permeable sheet having hydrophobicity, an air permeable sheet with the core part composed of polypropylene (PP) and the sheath part composed of polyethylene (PE) that is not hydrophilized, for example, can be mentioned.

Further, in the above-described embodiments, the moisture permeable filter medium is formed from two layers of the hydrophobic layer 2 and the hydrophilic layer 3, and the hydrophobic layer 2 and the hydrophilic layer 3 are laminated to be in contact with each other, but there is no limitation to this. Another layer (such as non-woven fabrics that do not affect the moisture permeability) may be laminated between the hydrophobic layer 2 and the hydrophilic layer 3. Further, in the state where the hydrophobic layer 2 and the hydrophilic layer 3 are laminated together, other layers (such as non-woven fabrics that do not affect the moisture permeability) may be laminated on the surface on the hydrophobic layer 2 side or the surface on the hydrophilic layer 3 side.

EXAMPLES

Hereinafter, Examples of the present invention will be described.

1. Used Materials (1) Hydrophilic Layer

Hydrophilized PTFE porous film (PTFE porous film, manufactured by NITTO DENKO CORPORATION, which was treated with PVA to be hydrophilized)

EVOH (ethylene-vinyl alcohol copolymer) filter medium (EVAL, manufactured by KURARAY CO., LTD.)

Non-woven fabrics 1 (non-woven fabrics that were made of core-sheath fibers with the core part composed of PP and the sheath part composed of PE and were treated with PMMA) (non-woven fabrics: HOP, manufactured by Hirose Paper Mfg Co., Ltd.)

Non-woven fabrics 2 (non-woven fabrics made of core-sheath fibers with the core part composed of PET and the sheath part composed of PA-6) (Colback, manufactured by BONAR)

Non-woven fabrics 3 (non-woven fabrics made of EVA fibers) (manufactured by NITTO DENKO CORPORATION)

(2) Hydrophobic Layer

PTFE porous film (manufactured by NITTO DENKO CORPORATION)

Non-woven fabrics 4 (non-woven fabrics made of core-sheath fibers with the core part composed of PP and the sheath part composed of PE) (HOP, manufactured by Hirose Paper Mfg Co., Ltd.)

Non-woven fabrics 5 (non-woven fabrics made of core-sheath fibers with the core part composed of PET and the sheath part composed of PE) (SE100SHO, manufactured by Unitika Ltd.)

The above-described hydrophilized PTFE porous film was formed using the following method. Specifically, 19 parts by weight of a liquid lubricant (dodecane) was uniformly mixed with 100 parts by weight of PTFE fine powder (polyfluorocarbon F104, manufactured by DAIKIN INDUSTRIES, LTD.) to form a mixture. Thus, the mixture was preformed. Next, the obtained preform was formed into a sheet by paste extrusion to form a formed product having a sheet shape. The obtained formed product having a sheet shape was allowed to pass through between a pair of metal rolling rolls to form an elongated sheet with a thickness of 200 μm. Then, the liquid lubricant was removed by drying. Further, the obtained elongated sheet was stretched in the longitudinal direction to 3 times at a stretching temperature of 280° C., and was further stretched in the width direction to 6 times at a stretching temperature of 150° C. by tentering to obtain a PTFE porous film.

Then, after impregnation with isopropyl alcohol, the obtained PTFE porous film was immersed in a PVA solution. Thereafter, PVA was crosslinked with glutaraldehyde to obtain a hydrophilized PTFE porous film.

Further, the PTFE porous film constituting the above-described hydrophobic layer was formed by the following method. Specifically, 19 parts by weight of a liquid lubricant (dodecane) was uniformly mixed with 100 parts by weight of PTFE fine powder (polyfluorocarbon F104, manufactured by DAIKIN INDUSTRIES, LTD.) to form a mixture. Thus, the mixture was preformed. Next, the obtained preform was formed into a sheet by paste extrusion to form a formed product having a sheet shape. The obtained formed product having a sheet shape was allowed to pass through between a pair of metal rolling rolls to form an elongated sheet with a thickness of 200 μm. Then, the liquid lubricant was removed by drying. Further, the obtained elongated sheet was stretched in the longitudinal direction to 14 times at a stretching temperature of 280° C., and was further stretched in the width direction to 30 times at a stretching temperature of 150° C. by tentering to obtain a PTFE porous film constituting a hydrophobic layer.

2. Measurement of Water Absorption Coefficient

The water absorption coefficient of the above-described used materials except the EVOH filter medium was measured according to ASTM standard D570 under the conditions of 23 degrees and 24 hours. The mass ratio of the filter medium that increased when the EVOH filter medium with a specific size was immersed in water was measured as the water absorption coefficient of the EVOH filter medium.

3. Production of Moisture Permeable Filter Medium

Moisture permeable filter media of Examples 1 to 4 and moisture permeable filter media of Comparative Examples 1 to 4 were produced by laminating the above-described used materials so as to have layer structures described in Table 1 below.

4. Measurement of Moisture Permeability

A weighed moisture absorbent (calcium chloride) was housed in a cup (defined in JIS L 1099 and having an opening face with a diameter of 60 mm), and the moisture permeable filter medium was attached to the opening of the cup so as to entirely cover the opening face of the cup without gaps. In this regard, the spacing between the moisture absorbent and the moisture permeable filter medium was 3 mm, and the moisture permeation area was 0.00283 $m^2$. The cup with its opening face covered by the moisture permeable filter medium was disposed in a thermostatic bath at a humidity of 80% and a temperature of 30° C. for one hour. Thereafter, the cup was taken out of the thermostatic bath, and the moisture absorbent was weighed. Then, using the difference A in the mass of the moisture absorbent between before being put in the thermostatic bath and after being put in the thermostatic bath (that is, the amount of water vapor absorbed by the moisture absorbent) and the area B of the opening face of the cup, the moisture permeability was calculated by formula (1) below. The moisture permeability is shown in Table 1 below.

$$\text{Moisture permeability } (g/m^2/h) = A/B \quad (1)$$

TABLE 1

|  | Layer structure | Water absorption coefficient (%) | Layer thickness (μm) | Total thickness (μm) | Mass per unit area (g/m$^2$) | Moisture permeability (g/m$^2$/h) |
|---|---|---|---|---|---|---|
| Reference Example | Hydrophobic layer (PTFE porous film) | 0 | 4 | 4 | 3 | 173 |
| Example 1 | Hydrophobic layer (PTFE porous film) | 0 | 4 | 70 | 3 | 170 |
|  | Hydrophilic layer (Non-woven fabrics 1) | 0.3-0.4 | 80 |  | 15 |  |

TABLE 1-continued

|  | Layer structure | Water absorption coefficient (%) | Layer thickness (μm) | Total thickness (μm) | Mass per unit area (g/m$^2$) | Moisture permeability (g/m$^2$/h) |
| --- | --- | --- | --- | --- | --- | --- |
| Example 2 | Hydrophobic layer (PTFE porous film) | 0 | 4 | 300 | 3 | 172 |
|  | Hydrophilic layer (Non-woven fabrics 2) | 1.6 | 300 |  | 50 |  |
| Example 3 | Hydrophobic layer (PTFE porous film) | 0 | 4 | 30 | 3 | 159 |
|  | Hydrophilic layer (Non-woven fabrics 3) | 0.03-0.05 | 30 |  | 15 |  |
| Example 4 | Hydrophilic layer (Hydrophilized PTFE porous film) | 30 | 50 | 100 | 20 | 168 |
|  | Hydrophobic layer (Non-woven fabrics 4) | <0.01 | 70 |  | 15 |  |
| Comparative Example 1 | Hydrophobic layer (PTFE porous film) | 0 | 4 | 70 | 3 | 152 |
|  | Hydrophobic layer (Non-woven fabrics 4) | <0.01 | 70 |  | 15 |  |
| Comparative Example 2 | Hydrophobic layer (PTFE porous film) | 0 | 4 | 320 | 3 | 155 |
|  | Hydrophobic layer (Non-woven fabrics 5) | <0.01 | 320 |  | 100 |  |
| Comparative Example 3 | Hydrophilic layer (Hydrophilized PTFE porous film) | 30 | 50 | 350 | 20 | 150 |
|  | Hydrophilic layer (Non-woven fabrics 2) | 1.6 | 300 |  | 50 |  |
| Comparative Example 4 | Hydrophilic layer (EVOH filter medium) | 0.3 | 350 | 350 | 50 | 140 |

<Summary>

As Examples and Comparative Examples are compared with each other, it is recognized that the reduction in moisture permeability is suppressed more in Examples than in Reference Example. That is, the hydrophobic layer and the hydrophilic layer are laminated together, one of the layers is composed of a PTFE porous film, and the other of the layers is composed of non-woven fabrics, so that the reduction in moisture permeability caused by the lamination of the non-woven fabrics on the PTFE porous film can be suppressed.

Further, the moisture permeability is generally inversely proportional to the thickness of the moisture permeable filter medium, but as Examples 1 to 3 are compared with each other, it is recognized that the moisture permeability in Example 2 that has the largest thickness is highest. That is, it is recognized that, in the case where the hydrophobic layer is composed of a PTFE porous film and the hydrophobic layer is composed of non-woven fabrics, the moisture permeability increases as the difference in water absorption coefficient between the hydrophobic layer and the hydrophilic layer increases.

REFERENCE SIGNS LIST

1: Moisture permeable filter medium
2: Hydrophobic layer
3: Hydrophilic layer

The invention claimed is:

1. A moisture permeable filter medium that is formed into a sheet so that water vapor is permeable from at least one surface side to the other surface side, the moisture permeable filter medium comprising:
   a hydrophobic layer having hydrophobicity and a hydrophilic layer having hydrophilicity that are laminated together, wherein
   one of the hydrophobic layer and the hydrophilic layer is composed of a PTFE porous film using PTFE,
   the other of the hydrophobic layer and the hydrophilic layer is composed of an air permeable sheet to which air is permeable, and
   the hydrophobic layer has a water absorption coefficient of less than 0.01%, and the hydrophilic layer has a water absorption coefficient of 0.01% or more.

2. The moisture permeable filter medium according to claim 1, wherein
   the air permeable sheet is formed using at least one sheet of non-woven fabrics, and
   the air permeable sheet has a thickness of 20 μm or more and 1000 μm or less.

3. The moisture permeable filter medium according to claim 1, wherein
   the hydrophobic layer and the hydrophilic layer are laminated to be in contact with each other.

4. The moisture permeable filter medium according to claim 1, wherein the water absorption coefficient of the hydrophilic layer is 0.03% or more and 30% or less.

* * * * *